United States Patent [19]

Kawano

[11] Patent Number: 5,495,743
[45] Date of Patent: Mar. 5, 1996

[54] LOWER TOOL DEVICE FOR PRESS BRAKE

[75] Inventor: Susumu Kawano, Atsugi, Japan

[73] Assignee: Amada Metrecs Company, Limited, Isehara, Japan

[21] Appl. No.: 251,136

[22] Filed: May 31, 1994

[51] Int. Cl.⁶ .................................................. B21D 37/04
[52] U.S. Cl. ................................... 72/481.9; 72/462
[58] Field of Search .......................... 72/444, 480, 481, 72/462

[56] References Cited

U.S. PATENT DOCUMENTS

| | | | |
|---|---|---|---|
| 4,598,574 | 7/1986 | Hegel et al. | 72/481 |
| 4,674,315 | 6/1987 | Linz | 72/481 |
| 4,993,255 | 2/1991 | Treillet . | |
| 5,033,283 | 7/1991 | Gloe et al. | 72/481 |
| 5,167,405 | 12/1992 | Cayley . | |
| 5,249,452 | 10/1993 | Baldwin et al. | 72/481 |

FOREIGN PATENT DOCUMENTS

| | | | |
|---|---|---|---|
| 387121 | 9/1990 | European Pat. Off. . | |
| 2916272 | 11/1979 | Germany . | |
| 3902918 | 4/1990 | Germany | 72/481 |
| 0182327 | 7/1990 | Japan | 72/481 |
| 5084529 | 4/1993 | Japan | 72/481 |

*Primary Examiner*—David Jones
*Attorney, Agent, or Firm*—Wigman, Cohen, Leitner & Myers

[57] ABSTRACT

A lower tool device for a press brake comprises: a T-shaped slot (19) extending in front and rear direction formed in a tool holder block (17) or between two adjacent tool holder blocks (17) mounted on a lower table (5) of a press brake; a flange member (23) movable into and from the slot and provided under a support rod (21) vertically disposed on an under surface of a tool (9) mounted on the tool holder block (17); a push member (27) attached to the tool holder block, for pushing the flange member downward; and a push urging device (27) for urging the push member so as to further push the flange member downward.

14 Claims, 7 Drawing Sheets

LOWER TOOL DEVICE FOR PRESS BRAKE

BACKGROUND OF THE INVENTION

1. Field of the Invention

The present invention relates to a lower tool device for a press brake, and more specifically to a lower tool device by which a lower tool can be replaced easily in a lower table.

2. Description of the Prior Art

As is well known, a press brake is provided with an upper table (which may be referred to as an upper apron) and a lower table (which may be referred to as a lower apron) arranged in such a way as to be opposed to each other, and further with a ram for moving either of the upper or lower table up and down.

To bend a plate like workpiece for instance, an upper tool is mounted on the lower part of the upper table, and a lower tool is mounted on the upper part of the lower table. Therefore, when the movable side table is moved up and down so that the upper and lower tools can engage with each other, a workpiece positioned between the upper and lower tools is bent.

In the prior art lower tool holder, as shown in FIG. 7, a tool holder block 705 is mounted on a base plate 703 mounted on the upper portion of a lower table 701 of a press brake. Further, a roughly T-shaped slot 707 is formed extending in the front and rear direction in the tool holder block 705 or between two adjacent tool holder blocks 705 arranged horizontally.

Further, a fastening bolt 711 is provided vertically on the under surface of the lower tool 709 from below, and further a washer member 713 is attached to this fastening bolt 711. A flange portion 705F of the tool holder block 705 is fastened by the fastening bolt 711 and the washer member 713 provided in the slot 707.

In other words, conventionally, the lower tool 709 is fastened to or loosened from the tool holder block 705 by fastening or loosening the fastening bolt 711 relative to the tool holder block 705.

In the prior art structure, although the structure of fastening the tool 709 to the tool holder block 705 is simple, a number of fastening bolts 711 are arranged in the longitudinal direction of the tool 709, and therefore it is necessary to fasten or loosen the number of fastening bolts 711 by inserting a tool (e.g., a spanner) into a narrow slot 707, thus causing a problem in that the tool exchanging work is extremely troublesome.

SUMMARY OF THE INVENTION

With these problems in mind, therefore, the object of the present invention is to provide a lower tool device by which the lower tool can be exchanged easily and quickly in the tool holder block.

To achieve the above-mentioned object, the lower tool device for a press brake according to the present invention comprises: a T-shaped slot extending in front and rear direction, formed in a tool holder block or between two adjacent tool holder blocks mounted on a lower table of a press brake; a flange member movable into and from said slot and provided under a support rod vertically disposed on an under surface of the tool; a push member attached to the tool holder block, for pushing said flange member downward; and a push urging device for urging said push member so as to push said flange member downward.

DETAILED DESCRIPTION OF THE PREFERRED EMBODIMENTS

Figure 1:
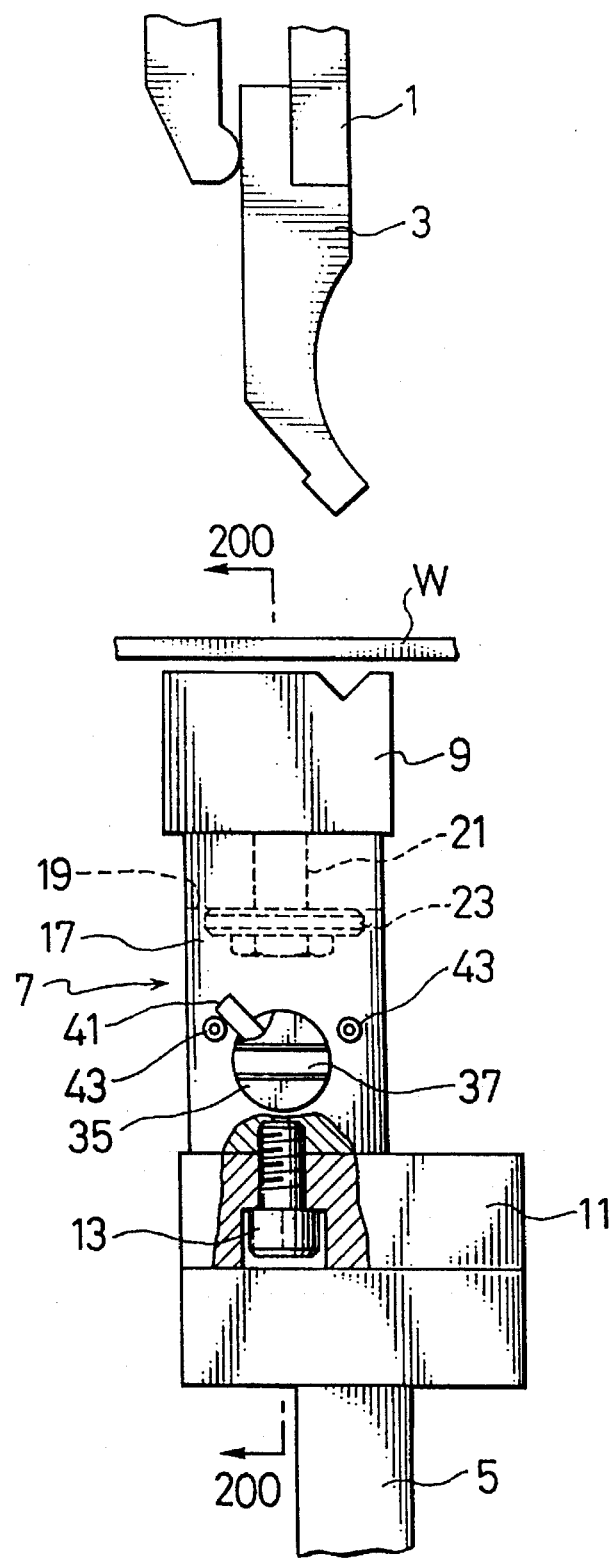
FIG. 1 is a side view showing an embodiment of the lower tool device according to the present invention.
Figure 2:
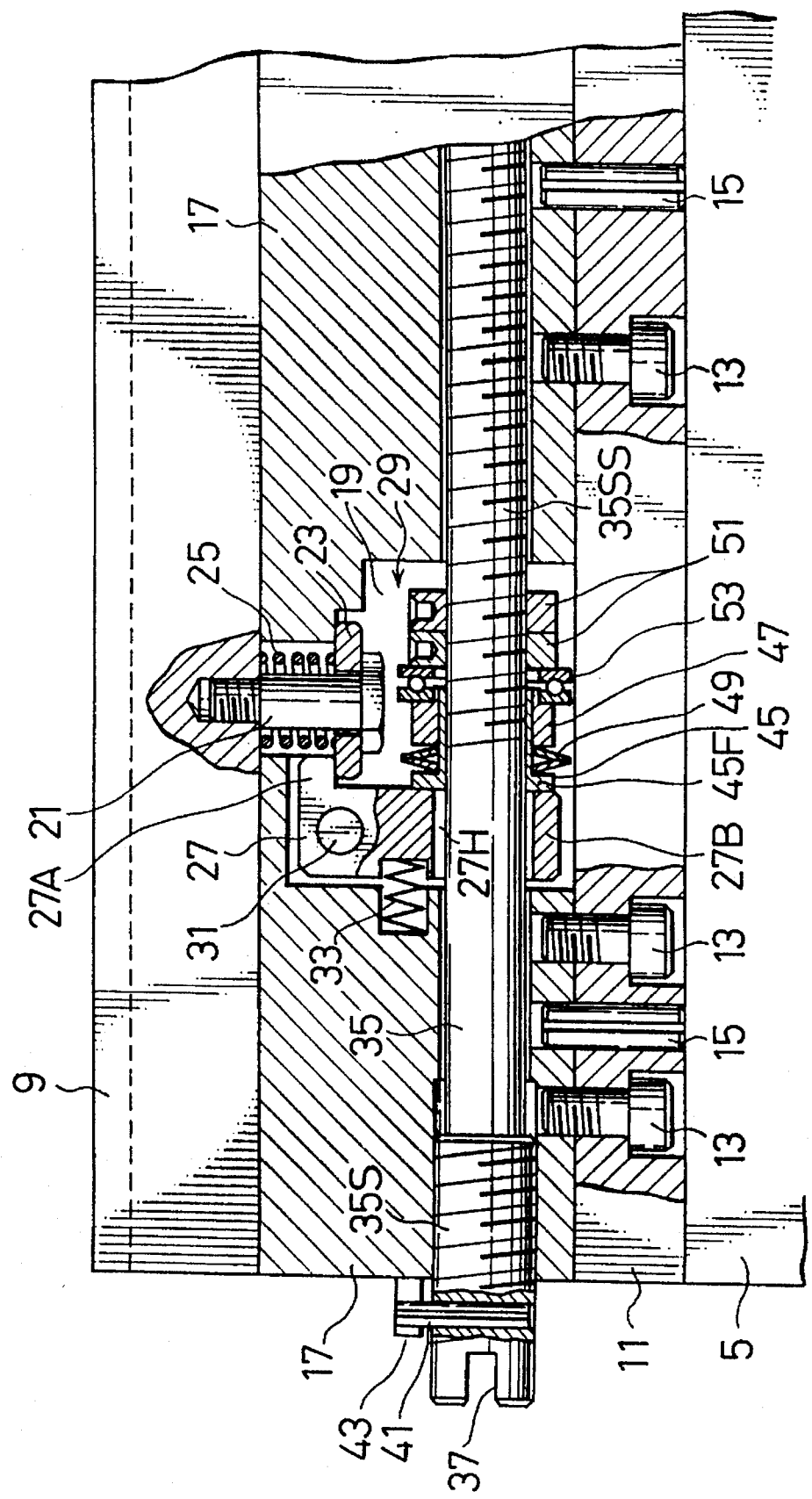
FIG. 2 is a cross-sectional view taken along the line 200—200 in FIG. 1.

With reference to FIGS. 1 and 2, an embodiment of the lower tool device according to the present invention will be described hereinbelow. An upper tool 3 is mounted on an upper table 1 of a press brake (not shown). Further, the lower tool device 7 is provided on a lower table 5 so as to be opposed to the upper table 1. On this lower tool device 7, a lower tool 9 is mounted for bending a workpiece W in cooperation with the upper tool 3.

The structure of mounting the upper tool 3 on the upper table 1 is well known, therefore, the detailed description of the upper tool mounting structure is omitted herein.

The lower tool device 7 for mounting the tool 9 on the upper table 5 so as to be exchangeable will be described in detail hereinbelow.

As shown in FIGS. 1 and 2, a tool holder block 17 is mounted on a base plate 11 mounted on the upper portion of the lower table 5, via a plurality of bolts 13 and pins 15. In the tool holder block 17 or between two adjacent tool holder blocks 17, a plurality of roughly T-shaped slots 19 extending in the front and rear direction (right and left direction in FIG. 1 and in the direction perpendicular to the paper in FIG. 2) are provided along the longitudinal axis of the tool 9 with a suitable interval.

Further, on the under surface of the tool 9 supported on the tool holder block 17, support rods 21 are provided vertically at positions corresponding to the slots 19. Further, at the lower portion of the support rod 21, a flange member 23 adapted to be inserted into the slot 19 (in the front and rear direction) is supported. Between the flange member 23 and the under surface of the tool 9, a spring 25 is disposed to urge the flange member 23 against the head portion of the support rod 21 so that a distance between the under surface of the tool 9, and the flange member 23 can be kept within a predetermined dimension precision.

Further, within the slot 19, there are provided a push member 27 for pushing the flange member 23 downward to fix the tool 9 to the tool holder block 17, and a push urging device 29 for urging the push member 27 so as to push the flange member 23 downward.

In more detail, in this embodiment, the push member 27 of bell crank type is pivoted about a pivotal axis 31. The push member 27 is formed with an upper horizontally extending arm portion 27A brought into contact with the upper surface of the flange member 23 and a vertically extending lower arm portion 27B. Further, a spring 33 is elastically disposed between the arm portion 27B and the tool holder block 17. This spring 33 functions in such a way that the push member 27 is pivoted counterclockwise and the horizontal arm portion 27A is moved away from the flange member 23.

Further, the vertical arm portion 27B of the push member 27 is formed with a lower horizontal hole 27H through which a screw rod 35 provided with the push urging device 29 is passed.

Figure 3:
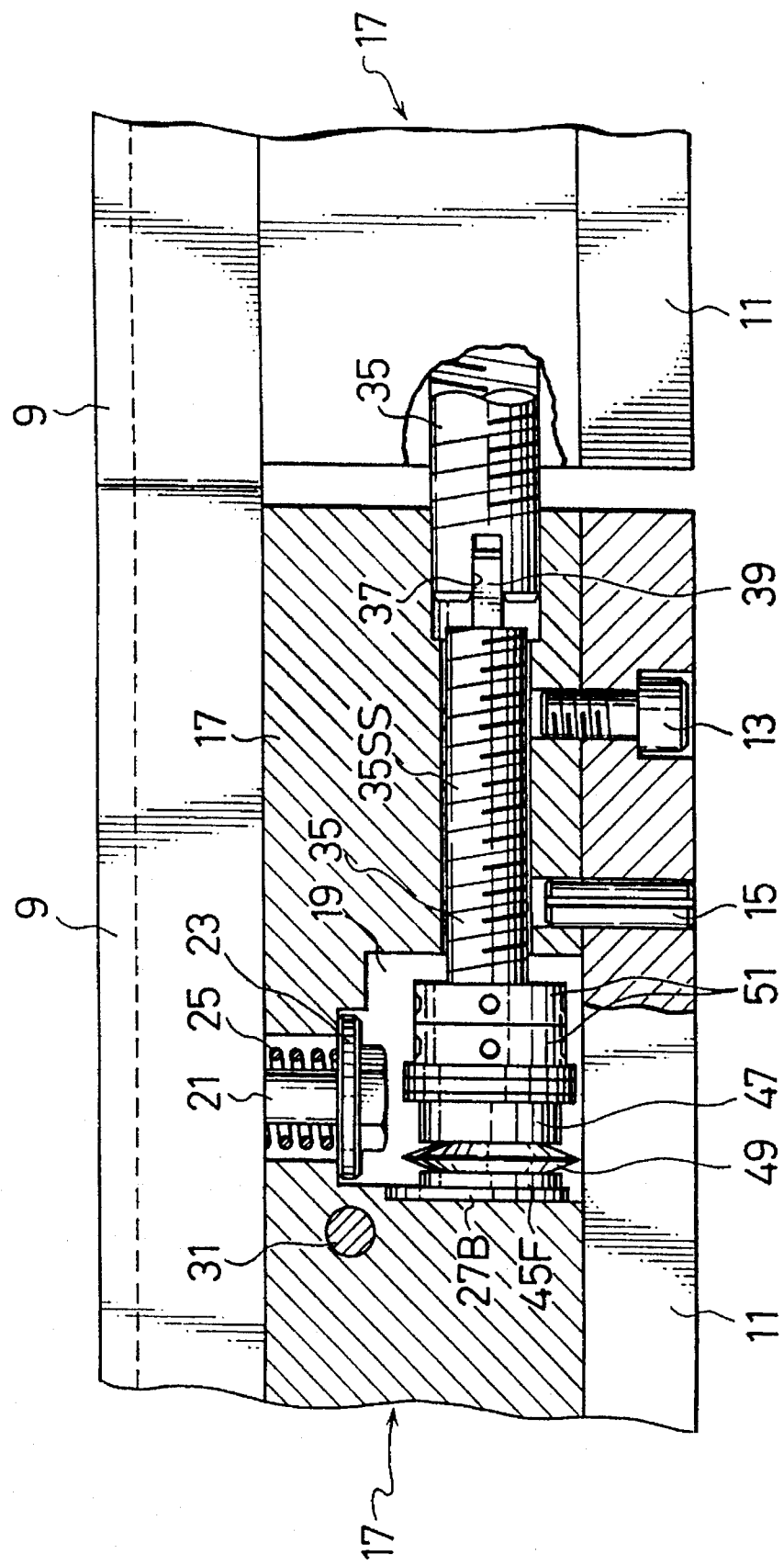
FIG. 3 is a cross-sectional view for assistance in explaining a link portion of a screw rod.

In more detail, the screw rod 35 extending in the horizontal direction is formed with a large diameter threaded portion 35S near the left end portion of the screw rod 35. The large diameter threaded portion 35S is engaged with the tool holder block 17 so as to be movable relative to the tool holder block 17 in the horizontal direction. Further, the screw rod 35 is formed with a recessed portion 37 on an extreme end (the left side) surface thereof and with a link portion 39 (see FIG. 3) having a projected portion engageable with the recessed portion 37 of another adjacent screw rod 35. The above-mentioned structure allows the tool holder block 17 to be manufactured as a unit; then it is possible to link a plurality of screw rods 35 supported by the respective tool holders 17 in sequence and thus to operate a plurality of push urging device 29 simultaneously. In addition, as shown in FIG. 1, a radially extending pin 41 is disposed on the end of the screw rod 35, and stopper pins 43 are implanted on one end surface of the tool holder block 17 to restrict the pivotal movement range of the pin 41.

In the above-mentioned structure, when pivoted, the screw rod 35 is moved horizontally in the right and left direction in FIG. 2. In this case, since the pivotal movement range of the screw rod 35 is restricted by the pins 41 and 43, the longitudinal movement (in the right and left direction) of the screw rod 35 can be also limited within a predetermined horizontal range.

The push urging device 29 is so constructed as to push the arm portion 27B of the push member 27 by the longitudinal movement of the screw rod 35. The push urging device 29 is composed of a sleeve 45 axially movably supported by the screw rod 35 and having a flange portion 45F brought into contact with the arm portion 27B of the push member 27, a ring member 47 supported by the sleeve 45 so as to be axially movable, and an elastic member 49 (a spring, rubber, disk spring, etc.) elastically disposed between the ring member 47 and the flange portion 45F of the sleeve 45.

The push urging device 29 serves to adjust the elastic force of the elastic member 49. That is, a nut member 51 is adjustably engaged with a second threaded portion 35SS of the screw rod 35, and a thrust bearing 53 is sandwiched between the nut member 51 and the ring member 47.

Figure 4A:
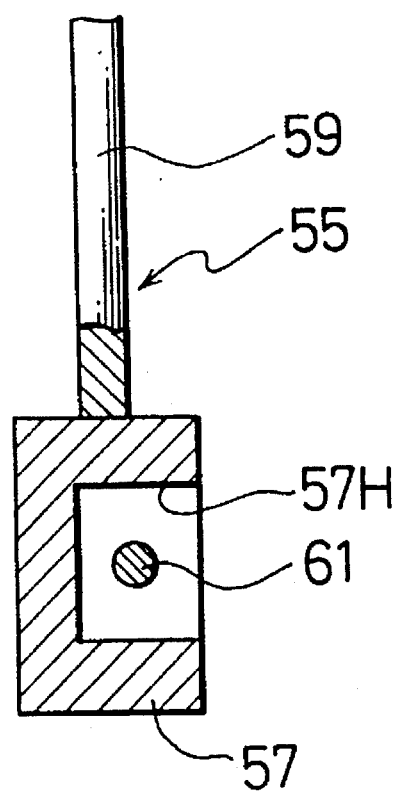
FIGS. 4A and 4B are views for assistance in explaining a tool for rotating the screw rod.
Figure 4B:
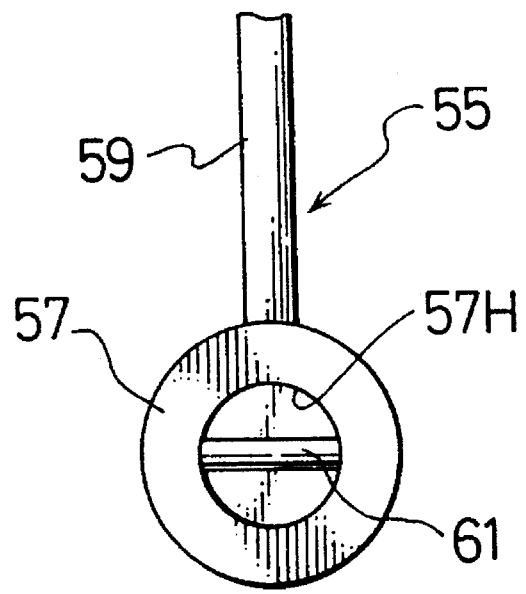

An example of a tool 55 for turning the screw rod 35 is shown in FIG. 4. A cap member 57 is adapted to be attached to an end portion of the screw rod 35. The cap member 57 is formed with a fit hole 57H and an engage pin 61 is provided within this fit hole 57H so as to be engaged with the recessed portion 37 of the screw rod 35. Further, a lever 59 is attached to the cap member 57.

In the structure as described above, first the cap member 57 of the tool 55 is fitted to one end of the screw rod 35 in such a way that the engage pin 61 is engaged with the recessed portion 37 of the end of the screw rod 35. Under these conditions, when the lever 59 is pivoted, the screw rod 35 is turned clockwise or counterclockwise in FIG. 1.

When the screw rod 35 is turned counterclockwise in FIG. 1, the screw rod 35 moves in the left direction in FIG. 2.

Accordingly, the arm portion 27B of the push member 27 is pushed in the left direction by the sleeve 45 of the push urging device 29, so that the arm portion 27A of the push member 27 pushes the flange member 23 in the downward direction.

When the flange member 23 is pushed downward by the arm portion 27A, because of the pushing force of the arm portion 27A that is so strong as to correspond to an elastic force of the elastic member 49 of the push urging device 29, the tool 9 is firmly fixed to the tool holder block 17.

When the screw rod 35 is turned in the clockwise direction in FIG. 1, the screw rod 35 is moved in the right direction in FIG. 2. Accordingly, the sleeve 45 of the push urging device 29 is moved away from the arm portion 27B of the push member 27, so that the push member 27 is pivoted in the counterclockwise direction by an elastic force of the spring 33. Under these conditions, the arm portion 27A of the push member 27 releases the flange portion 23 from the pushed condition. Then, the tool 9 can be moved in the front and back direction relative to the tool holder block 17 for tool exchange.

In this case, since the distance between the flange member 23 provided under the tool 9 and the under surface of the tool 9 is determined within a predetermined dimensional precision, the flange member 23 will not interfere with the tool holder block 17 while the tool is being exchanged, thus facilitating the exchange work of the tool 9.

Further, in FIG. 2, when the flange member 23 is pushed or released by pivoting the push member 27 clockwise or counterclockwise, it is possible to fix and release the tool 9 quickly; this is because the pivotal movement rate of the push member 27 is slight.

Figure 5:
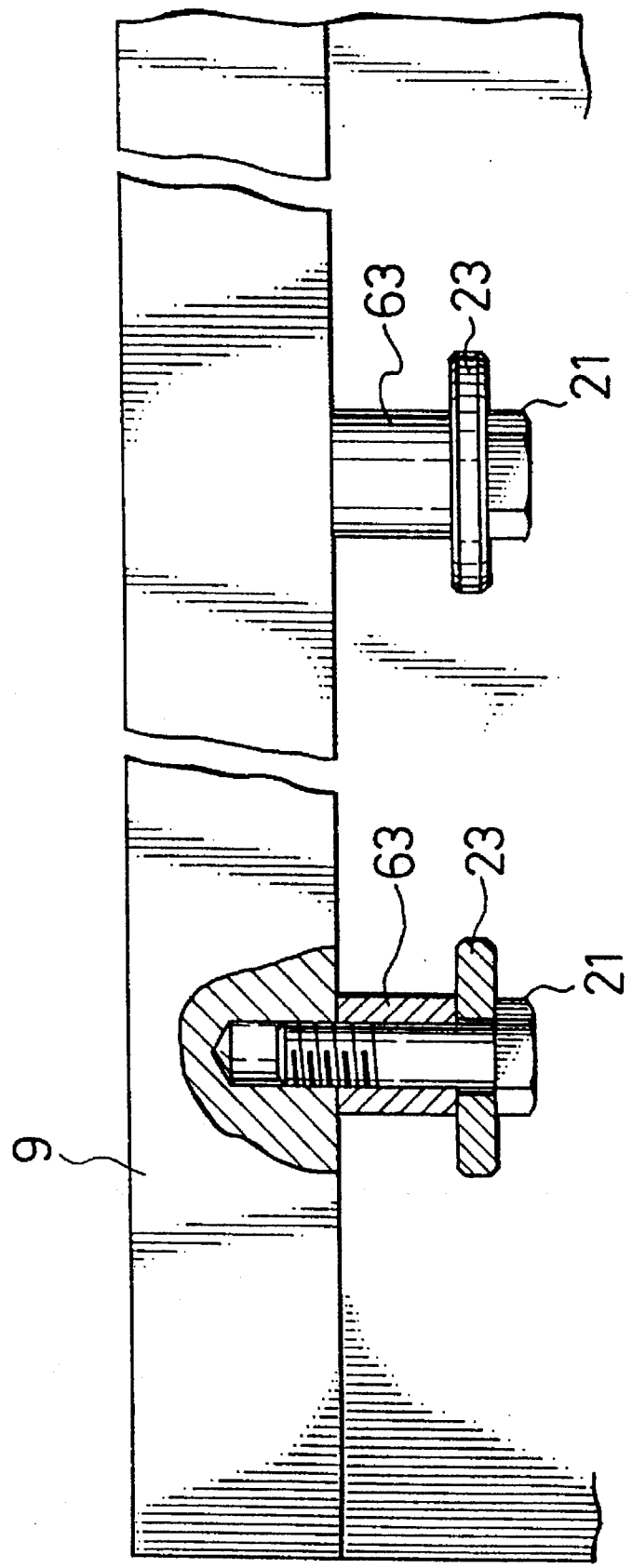
FIG. 5 is a side, partially cross-sectional, view for assistance in explaining a second embodiment according to the present invention, in which only the tool mounting portion is shown.

FIG. 5 shows another example of determining the distance between the under surface of the tool 9 and the flange member 23 within a predetermined dimensional precision. In this example, a collar 63 is interposed between the under surface of the tool 9 and the flange member 23.

Figure 6:
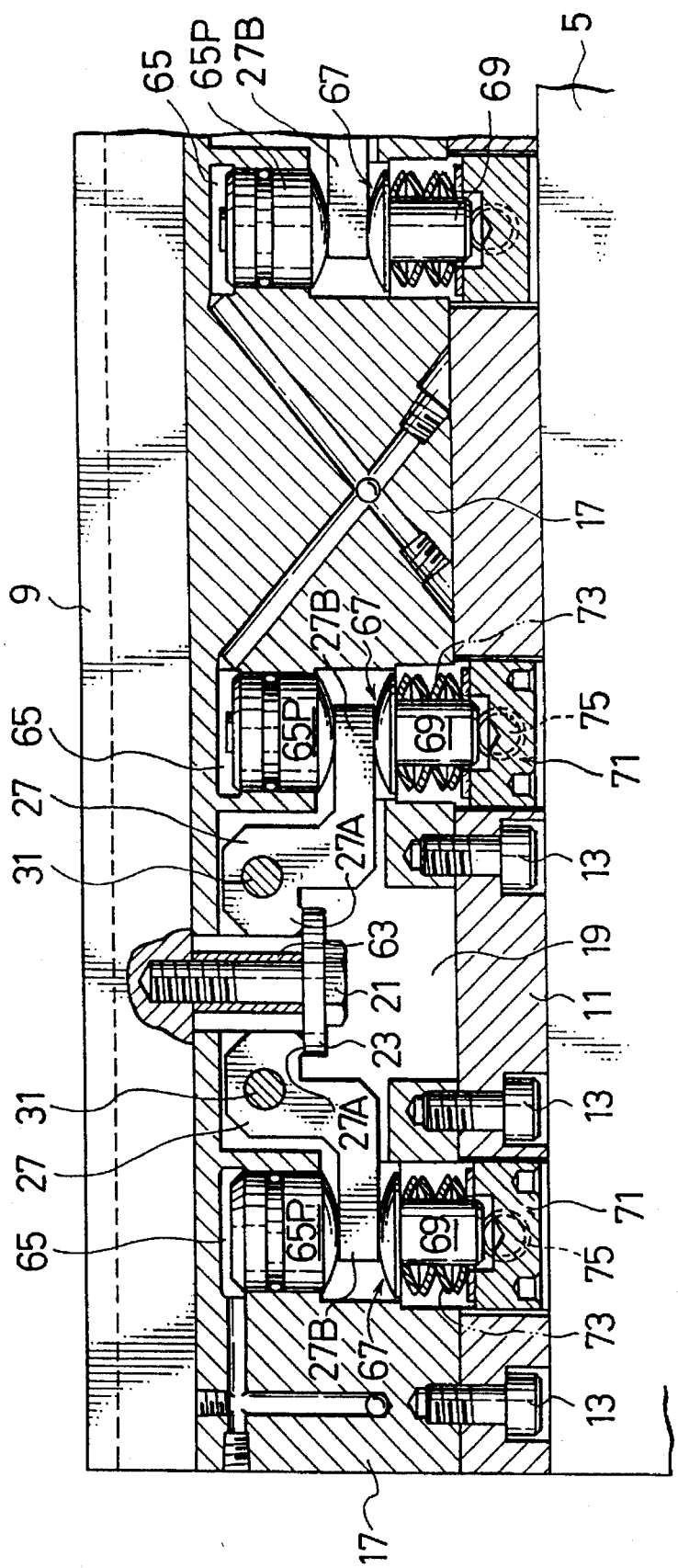
FIG. 6 is a cross-sectional view showing the second embodiment of the present invention.
Figure 7:
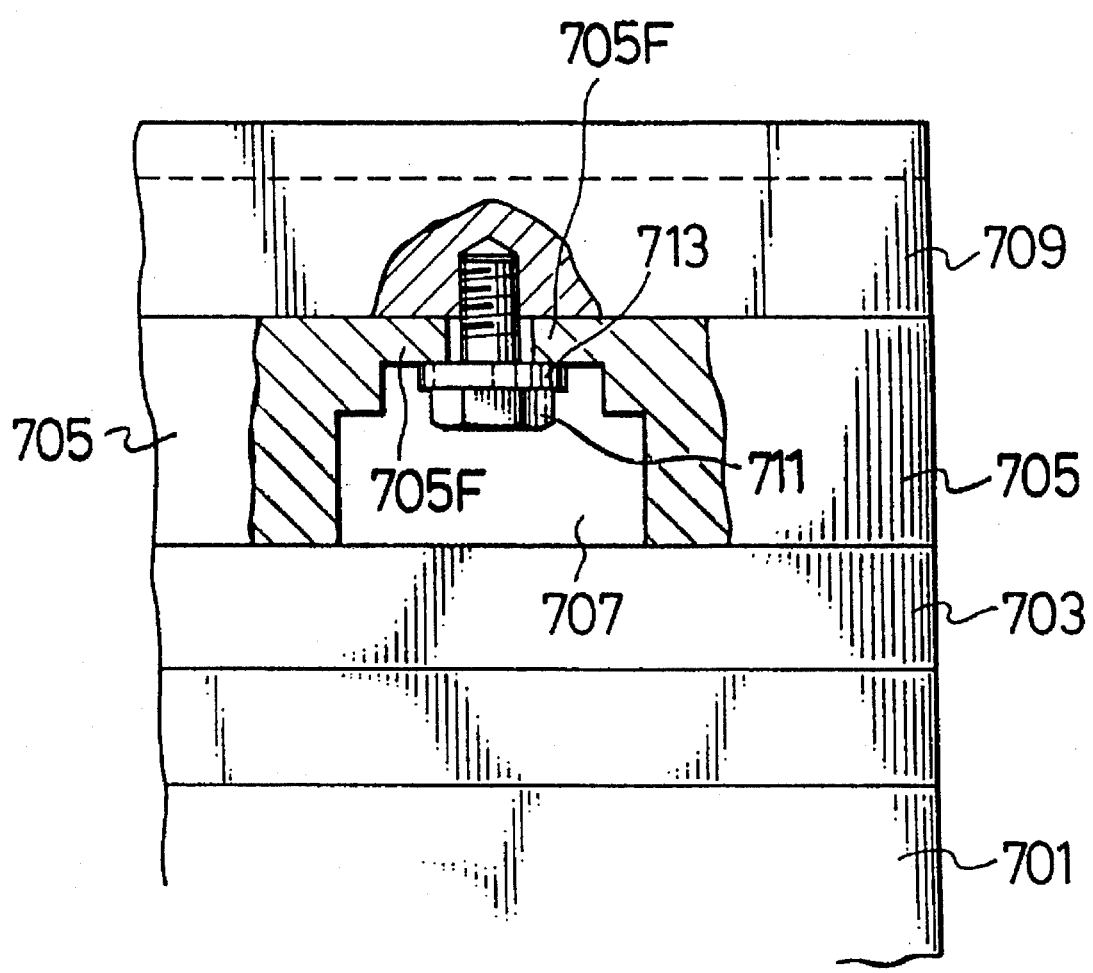
FIG. 7 is a partial cross-sectional view for assistance in explaining the prior art tool mounting structure.

A second embodiment of the present invention will be described hereinbelow with reference to FIG. 6. In this second embodiment, the two push members 27 are disposed in each of the respective tool holder blocks 17 in symmetrical positional relationship with respect to the flange member 23. Further, the arm portion 27B of the push member 27 is formed so as to extend in the horizontal direction, and hydraulic cylinders 65 formed in the tool holder block 17 are provided over the arm portions 27B, respectively. Pistons 65P are in contact with the upper portion of the arm members 27B, respectively.

Further, a pusher pin 69 of the push urging device 67 is in contact with the under surface of the arm portion 27B. The push urging device 67 is composed of the above-mentioned pusher pin 69, a seat member 71 such as a blind cap adjustably screwed into a base plate 11, and an elastic member 73 disposed between the pusher pin 69 and the seat member 71. Further, the seat member 71 is held by a set screw 75 screwed into the base plate 11 so as not to be loosened.

In the above-mentioned structure, when a hydraulic fluid is supplied to the hydraulic cylinder 65 to move the piston 65P in the downward direction against the elastic member 73 of the push urging device 67, the flange member 23 is released from the pushed condition by the arm portion 27A of the push member 27.

In contrast with this, when the hydraulic fluid is discharged from the hydraulic cylinder 65, the pusher pin 69 is moved in the upward direction by the action of the elastic member 73 of the push urging device 67, and the arm portion 27B of the push member 27 is pushed in the upward direction. Accordingly, the flange member 23 is pushed in the downward direction by the arm portion 27A of the push member 27 to fix the tool 9 to the tool holder block 17.

In the second embodiment, the fixing and releasing operation of the tool 9 can be achieved by the hydraulic cylinder 65 to and from which the hydraulic fluid is controllably charged or discharged. Therefore, it is possible to exchange the tool 9 easily without use of any tools.

As understood by the embodiments described above, in the lower tool device according to the present invention, it is possible to easily fix and release the tool 9 to or from the tool holder block 17, thus facilitating the tool exchange work.

What is claimed is:

1. A lower tool holding device for a press brake, the press brake being equipped with upper and lower tools for cooperating with each other to effect bending in a workpiece placed therebetween, the device comprising:

a tool holder block adapted to be mounted on a lower table of a press brake, and formed with a T-shaped slot for receiving a flange member coupled to the lower tool, a push member attached to the tool holder block, for clamping the flange member inserted into the T-shaped slot, the push member including a bell crank pivotally attached to the tool holder block; and a push urging device for urging the push member so as to clamp the flange member, said push urging device including:

a screw rod having an axial direction and formed with a first threaded portion engaged with the tool holder block, so that the screw rod is moved in a longitudinal direction of the tool holder block when rotated, a sleeve supported by the screw rod so as to be movable in the axial direction of the screw rod, and brought into contact with the bell crank, and an elastic member supported by the screw rod to urge the sleeve toward the bell crank.

2. The lower tool holding device of claim 1, wherein the push urging device further includes means for adjusting an urging force applied to the bell crank from the sleeve.

3. The lower tool holding device of claim 2, wherein the urging force adjusting means includes a nut engaged with a second threaded portion of the screw rod.

4. The lower tool holding device of claim 3, wherein the urging force adjusting means further includes a thrust bearing provided between the nut and the elastic member.

5. The lower tool holding device of claim 1, further comprising means for releasing the clamping of the push member against the flange member.

6. The lower tool holding device of claim 1, further comprising:

a lower tool;

a support rod secured to said lower tool;

a flange member supported on the support rod so as to be movable along a longitudinal axis of the support rod; and means for maintaining a distance between the flange member and the lower tool within a predetermined range.

7. A lower tool holding device for a press brake, the press brake being equipped with upper and lower tools for cooperating with each other to effect bending in a workpiece placed therebetween, the device comprising:

a plurality of tool holder blocks adapted to be mounted on a lower table of a press brake, adjacent tool holders being formed with a T-shaped slot therebetween for receiving a flange member coupled to the lower tool, a push member attached to the tool holder block, for clamping the flange member inserted into the T-shaped slot, the push member including a bell crank pivotally attached to the tool holder block; and a push urging device for urging the push member so as to clamp the flange member, said push urging device including:

a screw rod having an axial direction and formed with a first threaded portion engaged with the tool holder block, so that the screw rod is moved in a longitudinal direction of the tool holder block when rotated, a sleeve supported by the screw rod so as to be movable in the axial direction of the screw rod, and brought into contact with the bell crank, and an elastic member supported by the screw rod to urge the sleeve toward the bell crank.

8. The lower tool holding device of claim 7, wherein the push urging device further includes means for adjusting an urging force applied to the bell crank from the sleeve.

9. The lower tool holding device of claim 8, wherein the urging force adjusting means includes a nut engaged with a second threaded portion of the screw rod.

10. The lower tool holding device of claim 9, wherein the urging force adjusting means further includes a thrust bearing provided between the nut and the elastic member.

11. The lower tool holding device of claim 7, further comprising means for releasing the clamping of the push member against the flange member.

12. The lower tool holding device of claim 7, further comprising:

a lower tool;

a support rod secured to said lower tool;

a flange member supported on the support rod so as to be movable along a longitudinal axis of the support rod; and means for maintaining a distance between the flange member and the lower tool within a predetermined range.

13. A lower tool holding device for a press brake, the press brake being equipped with upper and lower tools for cooperating with each other to effect bending in a workpiece placed therebetween, the device comprising:

a plurality of tool holder blocks adapted to be mounted on a lower table of a press brake, each block being formed with a T-shaped slot for receiving a flange member coupled to the lower tool, a plurality of push members each attached to each tool holder block, for clamping the flange member inserted into the T-shaped slot;

a plurality of screw rods each rotatably attached to each tool holder block, for acting on the push member attached to the tool holder block; and wherein each screw rod is provided, at a first end, with a tool attachment section adapted to be engaged with a tool for turning the screw rod, and at a second end, a coupling section of a screw rod of an adjacent tool holder block.

14. A lower tool holding device for a press brake, the press brake being equipped with upper and lower tools for cooperating with each other to effect bending in a workpiece placed therebetween, the device comprising:

a plurality of tool holder blocks adapted to be mounted on a lower table of a press brake, adjacent blocks being formed with a T-shaped slot therebetween for receiving a flange member coupled to the lower tool, a plurality of push members each attached to each tool holder block, for clamping the flange member inserted into the T-shaped slot;

a plurality of screw rods each rotatably attached to each tool holder block, for acting on the push member attached to the tool holder block; and wherein each screw rod is provided, at a first end, with a tool attachment section adapted to be engaged with a tool for turning the screw rod, and at a second end, a coupling section adapted to be coupled with a tool attachment section of a screw rod of an adjacent tool holder block.

* * * * *